United States Patent [19]
Holan

[11] 3,906,035
[45] Sept. 16, 1975

[54] PROCESS FOR THE PREPARATION OF CIS-8-DODECEN-1-OL ACETATE
[75] Inventor: George Holan, Brighton, Australia
[73] Assignee: Commonwealth Scientific and Industrial Research Organization, Campbell, Australia
[22] Filed: Jan. 29, 1974
[21] Appl. No.: 437,694

[30] Foreign Application Priority Data
Jan. 30, 1973 Australia............................ 2069/73

[52] U.S. Cl. ......... 260/491; 260/465.9; 260/488 H; 260/496; 260/526 N; 260/638 Y; 260/654 R; 424/84
[51] Int. Cl.² ......................................... C07C 67/28
[58] Field of Search............ 260/491, 488 H, 654 R, 260/638 Y, 526 N, 465.9

[56] References Cited
UNITED STATES PATENTS
3,845,108  10/1974  Roelofs et al.................. 260/488 H Primary Examiner—Vivian Garner
Attorney, Agent, or Firm—Bacon & Thomas

[57] ABSTRACT

An improved process for the manufacture of cis-8-dodecen-1-ol acetate, the sex pheromone of the oriental fruit moth Cydia molesta, comprises the steps of: i. reacting 1-chloro-6-iodo-hexane with pent-1-yne in liquid ammonia in the presence of lithium amide as a catalyst; ii. reacting the product of step (i) with an alkali metal cyanide in the presence of a metal iodide as catalyst; iii. subjecting the product of step (ii) to alkaline hydrolysis; iv. reducing the product of step (iii) with sodium bis(methoxyethoxy) aluminium hydride; v. acetylating the product of step (iv); and vi. reducing the product of step (v) with bis(sec-isoamyl)borane.

2 Claims, No Drawings

PROCESS FOR THE PREPARATION OF CIS-8-DODECEN-1-OL ACETATE

This invention relates to an improved process for the manufacture of cis-8-dodecen-1-ol acetate.

This compound was first reported as a sex pheromone for the oriental fruit moth *Grapholitha molesta* (sub family Olethrentinae) by Roelofs and other in Nature, 224 723 (1969). It has been shown recently that it is similarly active on the related oriental fruit moth *Cydia molesta* (Rothschild & Minks, Annual Report of the Division of Entomology, CSIRO, Australia). The compound could thus find use in eradicating this pest by the known procedure of using the compound as a lure in a trap to catch the males of the species.

Roelofs (loc. cit.) states that the compound was synthesized by two independent routes and referred to a previous paper in Nature 219 513 (1968) in which two synthetic routes were described to prepare an analogous compound, cis-11-tetradecen-1-ol acetate. These will be referred to as the "pyranyl route" and the "Wittig route". The pyranyl route is known and has been used for other similar compounds. The steps are as follows 1. $HO(CH_2)_7OH \rightarrow HO(CH_2)_7Cl$ (I)

2. 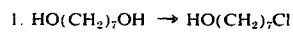 (II)

3. 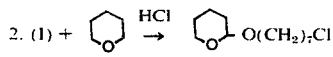 (III)

4. 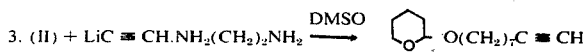 (IV)

5. 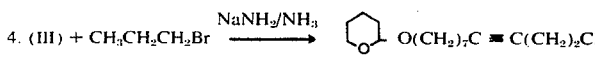 (V)

6. 

Steps 5 and 6 may be carried out in reverse order and LiNH$_2$ may be used in step 4 in place of Na NH$_2$. This method has been used to prepare cis-7-dodecen-1-ol acetate (Green N. et al.)., J. Medicinal Chem. 10 533 (1967), cis-9-tetradecen-1-ol acetate (Warthen D., J. Medicinal Chem. 11 371 (1968). The overall yield for the former was about 60% and for the latter 29%. Roelofs and Arn (Nature 1968) use the method to prepare cis-11-tetradecen-1-ol acetate with steps 3 and 4 combined by using the lithium salt of 1-butyne.

The Wittig route, described in the 1968 Nature paper, was based on the following key steps.

A. $CH_3COOCH_2(CH_2)_9CH_2Br$ + $Ph_3P$
$CH_3COOCH_2(CH_2)_9 CH_2PPh_3^+Br^-$ (i).

B. (i)+ NaOme + $CH_3CH_2CHO$
$CH_3COOCH_2(CH_2)_9CH=CHCH_2CH_3$.

These reactions, when applied to the present compound by us did not work.

Another method has been described by Berger in Ann. Entomol. Soc. Am. 59 767 (1966) for preparation of cis-7-dodecen-1-ol acetate. The steps are as follows.

1. 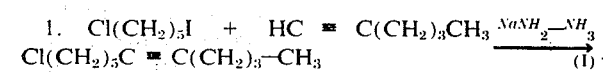 (I)

2. (I) + NaCN → $NC(CH_2)_5C \equiv C(CH_2)_3CH_3$ (II)

3. (II) $\xrightarrow{NaOH}$ $HOOC(CH_2)_5C \equiv C(CH_2)_3CH_3$ (III)

4. (III) + $H_2$ $\xrightarrow{Pd/BaSO_4}$
$HOOC(CH_2)_5CH = CH(CH_2)_3CH_3$ (IV)

5. (IV) + LiAlH$_4$ →
$HOCH_2(CH_2)_5CH = CH(CH_2)_3CH_3$ (V)

6. (V) + $CH_3COCl$ →
$CH_3COOCH_2(CH_2)_5CH = CH(CH_2)_3CH_3$.

This method gave an overall 28% yield.

None of the methods described above is satisfactory for preparing large (Kg or more) quantities of the compounds for the following reasons.

(a) The compound must be substantially pure cis form; any trans form present, itself inactive, has an inhibiting effect on the activity of the cis compound. Experiments have shown that when the trans form rises to 10% by weight, all attractant activity is virtually gone. Lesser amounts reduce the activity considerably. This has been reported to occur with analogous pheromones (Roelofs and Comeau, Nature 220 600 (1968).

Stereospecificity is affected by the reagent used to reduce the triple bond and by the conditions to which the resulting double bond is subsequently subjected. Thus it is desirable to make this the last step but this is not done in the Berger method presumably because LiAlH$_4$ will reduce the triple bond non-stereospecifically, and must therefore be used after double bond formation. As a result, the acetyl chloride reation (6) must be carried out at low temperature to avoid isomerization of the product. The reductant used in the known methods is the so-called Lindlar catalyst system reported by Lindlar in Helvet. Chim. Acta 35 446–7 (1952). It comprises a hydrogenation using a palladium on barium sulphate catalyst which has been poisoned with synthetic quinoline. Although it is fairly stereospecific, it is not uncommon to obtain significant amounts of the trans isomer from this reaction.

b. LiALH$_4$, used in the Berger method is dangerous to handle on a large scale as a heterogeneous suspension and furthermore, as mentioned above, it reduces the triple bond non-stereospecifically.

c. The introduction of the nitrile (Step 2) in the Berger scheme is very difficult when applied to the present compound. Whereas the step took 18 hours for substantially completion for the cis-7-dodecen-1-ol acetate preparation, conversion was only 70% after 96 hours when applied to the synthesis of the present compound.

The problems outlined above have now been overcome or reduced by modifications to the Berger reaction scheme. The reaction scheme of the process of the present invention is as follows.

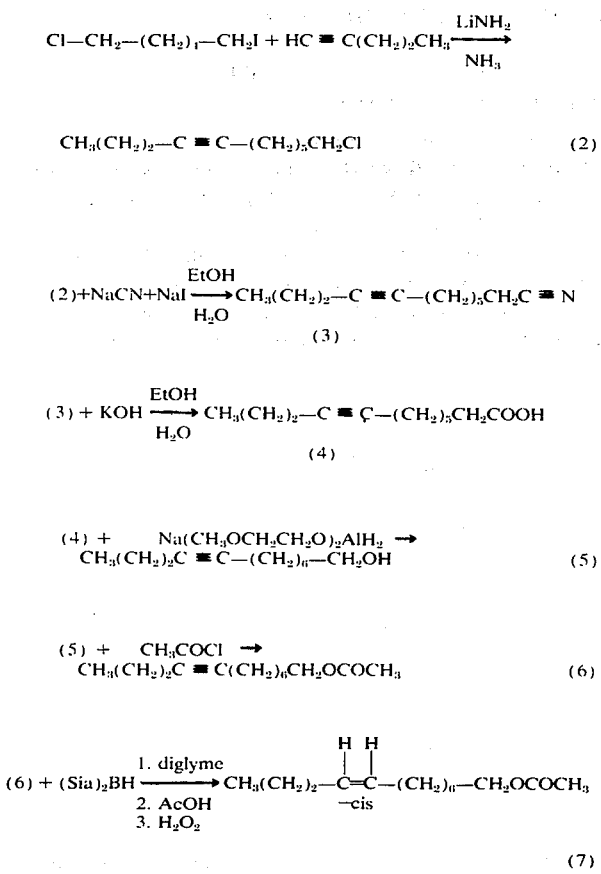

(The symbol "Sia" stands for the sec-isoamyl group.)

In accordance with one aspect of the present invention, therefore, there is provided a process for the production of cis-8-dodecen-1-ol acetate which comprises the steps of:

i. reacting 1-chloro-6-iodo-hexane with pent-1-yne in liquid ammonia in the presence of lithium amide as a catalyst;

ii. reacting the product of step (i) with an alkali metal cyanide in the presence of a metal iodide as catalyst;

iii. subjecting the product of step (ii) to alkaline hydrolysis;

iv. reducing the product of step (iii) with sodium bis(methoxyethoxy) aluminum hydride;

v. acetylating the product of step (iv); and vi. reducing the product of step (v) with bis(sec-isoamyl)-borane.

The significant improvements offered by the present process over those of Berger and others are as follows:

a. Reduction in the last step.

b. The application of $(Sia)_2BH$ as a stereospecific reducing agent giving very high (> 99%) stereospecificity. $(Sia)_2BH$ is a hydroborating agent described by H. C. Brown and G. Zweifel in J. Am. Chem. Soc. 83 1241 (1961). It is made by the reaction of 2-methyl-2-butene with sodium borohydride and boron trifluoride giving bis(sec-isoamyl)borane (disiamylborane).

c. The use of sodium bis(methoxyethoxy) aluminum hydride, which because it is a homogeneous catalyst, reduces the hazards normally associated with reductions using lithium aluminum hydride. Used on a large scale, lithium aluminum hydride is hazardous, particularly as it is used as a suspension. It also allows this step to be carried out before reduction of the triple bond as the reagent does not reduce such bonds.

d. The use of an iodide catalyst to speed up the introduction of the nitrile group.

Experiment has shown that about 70% conversion to the nitrile was achieved under Berger's conditions. With the addition of sodium iodide the reaction can be completed with a reasonable time, say 18 to 24 hours. The amount of sodium iodide is not critical and can vary from about 0.01 to 1 mole per mole of compound (2). More could be used but would be unnecessary.

The overall yield obtained using the specific reagents defined above is 60% of pure (better than 99%) cis isomer.

The lithium amide catalyst in step (i) may be replaced by other alkali metal amides but the reaction is best with the lithium compound.

The preferred alkali metal cyanide and iodide in step (ii) are sodium cyanide and sodium iodide respectively, but other cyanides and iodides may be used provided they are soluble in the reactive medium (usually ethanol/water).

The preferred procedure in step (iii) is to hydrolyse with potassium hydroxide in ethanol/water but any other suitable hydrolysis procedure may be used.

Acetylation in step (V) is most conveniently achieved with acetyl chloride but any other suitable procedure may be used.

The invention includes each of the individual steps (i) to (vi) of the reaction and any two or more of such steps.

The invention also includes the compound cis-8-dodecen-1-ol acetate whenever made by the process of the invention or any of the steps thereof and further includes insect lures and methods for insect control incorporating the compound when so made.

EXAMPLE

The invention is further described and illustrated by the following description of the preferred embodiment of the six steps leading to cis-8-dodecan-1-ol acetate.

Preparation of cis-8-dodecan-1-ol acetate
1-Chloroundec-7-yne

To lithium amide (from lithium, 10.8 gm 1.51 moles) in liquid ammonia (2.5 l) under argon was added pent-1-yne (180 ml) over 35 minutes. The reaction mixture was stirred an additional 90 minutes then 1-iodo-6 chlorohexane (310 gm) was added dropwise over 90 minutes. After stirring for 16 hours the ammonia was evaporated. Solid ammonium chloride (40 gm) and ether (500 ml) were added to the residue and then water (500 ml). Poured into ice water (1000 ml) and extracted with ether (4 × 100 ml). Ether extracts washed with 0.1M HCl and water and dried over $MgSC_4$. Evaporation of solvent yielded an oil 232 gm.

Fractional distillation gave pure 1-chloroundec-7-yne BP 60–1/0.2 mm 200 gm (86%).

1-Cyanoundec-7-yne

To 1-chloroundec-7-yne (233 gm) dissolved in 96% ethanol (1.7 l) was added sodium iodide (100 gm) and sodium cyanide (125 gm) in water (500 ml) and the mixture refluxed under nitrogen. After 24 hours analysis of the mixture showed conversion almost complete. Solvent was removed on the rotary evaporator and the nitrile isolated as an oil 208 gm (94%). (Reaction carried out in the absence of sodium iodide showed about 70% conversionn after 96 hours).

8-Dodecynoic acid

To 1-cyanoundec-7-yne (223 gm) in 96% ethanol (1.7 l) was added potassium hydroxide (120 gm) in water (500 ml). The mixture was refluxed under nitrogen until analysis indicated hydrolysis was complete. Solvent was removed on the rotary evaporator and the residue was taken up in ice water (2 l), extracted with ether (2 × 150 ml) then acidified. Extracted with ether (4 × 200 ml) and the extracts washed with water (500 ml). After drying with $MgSO_4$, evaporation of the solvent yielded the required product as an oil 235.4 gm (97%).

8-Dodecyn-1-ol

8-Dodecynoic acid (265 gm) in benzene (200 ml) was added dropwise over 50 min to a stirred 25% solution of sodium bis(methoxyethoxy) aluminum hydride in benzene (1.4 l.) maintained under nitrogen at 50°C. After the addition was completed the stirred mixture was refluxed for 1 hour and then cooled in an ice bath. 15% sulphuric acid (2 l) was added, maintaining the temperature below 10°C. Benzene layer was separated and the aqueous layer was extracted with ether (3 × 150 ml). The extracts were combined and washed with water (1 × 500 ml) and then dried over $MgSO_4$. Evaporation of the solvent yielded the required product 236 gm (96%).

8-Dodecyn-1-ol acetate

8-Dodecyn-1-ol (250 gm) was dissolved in glacial acetic acid (250 ml) and cooled to 5°C. Acetyl chloride (250 ml) was added over 20 minutes and the mixture warmed to reflux. Refluxed 1 hour and the solvent evaporated under reduced pressure. The residue was taken up in ether (500 ml) and washed with ice cold sodium bicarbonate solu. (1 × 500 ml) and water. After drying over $MgSO_4$ evaporation of the solvent yielded an oil 300 gm. Fractional distillation gave the pure product BP 103–3.5/0.2 mm 285 gm. (93%).

cis-8-Dodecen-1-ol acetate

Disiamylborane was generated by the addition of boron trifluoridediethyl etherate (68 ml) to a stirred mixture of 2-methyl-2-butene (114.9 ml) and sodium borohydride in diglyme (372 ml of a 1.13 molar solution) maintained at −5° C. The mixture was stirred at this temperature for 2 hours then 8-dodecyn-1-ol acetate (101.3 gm) was added over 2 minutes maintaining the temperature at −5° C with vigorous cooling. The reaction mixture was warmed to 25°C and stirred for an additional 2 hours then cooled to 0° C. Acetic acid (200 ml) was added dropwise with stirring and the reaction continued for 4 hours. The solution was poured into ice-water (2 l) and extracted with ether (3 × 150 ml). The extracts were washed with sodium bicarbonate solution (1 × 500 ml) and water then dried over $MgSo_4$. On evaporation of solvent and residual diglyme an oil was obtained. The oil was dissolved in tetrahydrofuran (100 ml) and cooled to 0° C. Sodium hydroxide solution (115 ml of a 3M solution) and 30% hydrogen peroxide solution (115 ml) were added simultaneously maintaining the temperature at 0° C and stirring vigorously. The mixture was warmed to 35–40° C and reacted to this temperature for 2 hours. The mixture was added to ice water (i.e.) and extracted with ether (4 × 100 ml). The extracts were washed with water (2 × 250 ml) and dried over $MgSO_4$. Evaporation of solvent yielded an oil 102.6 gm. On fractional distillation pure cis-8-dodecen-1-ol acetate was obtained B.P. 65–70/0.01 mm 88 gm (86%).

I claim:

1. A process for the preparation of cis-8-dodecen-1-ol acetate comprising:
    a. reacting 1-chloro-6-iodo-hexane with pent-1-yne in liquid ammonia in the presence of a lithium amide catalyst to form -1-chloroundec-7-yne.
    b. reacting the 1-chloroundec-7-yne with an alkali metal cyanide in the presence of a metal iodide as catalyst to form 1-cyanoundec-7-yne
    c. subjecting the 1-cyanoundec-7-yne to alkaline hydrolysis to form 8-dodecynoic acid
    d. reducing the 8-dodecynoic acid with sodium bis(methoxyethoxy) aluminium hydride to form 8-dodecyn-1-ol
    e. acetylating the 8-dodecyn-1-ol to form 8-dodecyn-1-ol acetate, and
    f. stereospecifically reducing the 8-dodecyn-1-ol acetate with bis(sec-isoamyl)-borane to form cis-8-dodecen-1-ol acetate.

2. A process for the productin of cis-8-dodecen-1-ol acetate consisting essentially of the step of reducing 8-dodecyn-1-ol acetate with bis(sec-isoamyl)-borane.

* * * * *